United States Patent [19]

Onishi

[11] Patent Number: 5,266,879
[45] Date of Patent: Nov. 30, 1993

[54] STEPPING MOTOR DRIVING CIRCUIT

[75] Inventor: Kazuhisa Onishi, Tokyo, Japan

[73] Assignee: Seiko Instruments Inc., Japan

[21] Appl. No.: 851,751

[22] Filed: Mar. 16, 1992

[30] Foreign Application Priority Data

Apr. 1, 1991 [JP] Japan .................................. 3-68569

[51] Int. Cl.[5] ............................................. G05B 19/40
[52] U.S. Cl. ..................................... 318/685; 318/696
[58] Field of Search ................................ 318/685, 696

[56] References Cited

U.S. PATENT DOCUMENTS

| | | | |
|---|---|---|---|
| 4,409,530 | 10/1983 | Neeper et al. | 318/685 |
| 4,471,283 | 9/1984 | Presley | 318/696 |
| 4,524,399 | 6/1985 | Jepsen | 318/696 |
| 4,906,910 | 3/1990 | Tanuma et al. | 318/696 |
| 4,983,891 | 1/1991 | Sekimoto | 318/696 |

*Primary Examiner*—William M. Shoop, Jr.
*Assistant Examiner*—Karen Masih
*Attorney, Agent, or Firm*—Bruce I. Adams; Van C. Wilks

[57] ABSTRACT

A stepping motor driving circuit comprising control means for controlling rotation of a stepping motor, driving means for supplying the stepping motor with a driving signal consisting of excitation pulses in accordance with rotation control, chopping means for executing intermittent chopping of the excitation pulse, and voltage monitoring means for monitoring fluctuation of driving voltage, wherein the control means has means for adjusting the intermittent chopping execution time by controlling the chopping means in accordance with the monitored driving voltage. The driving circuit can be applied to rotation control of the stepping motor mounted on a line printer as a paper feed driving source. In this case, the control means controls rotation of the stepping motor synchronously with the line printing speed of the line printer. To prevent bad influence due to decrease of effective voltage and execute high-speed step rotation at an interval shorter than delay time, normal driving is executed without execution of intermittent chopping and stable motor torque can be obtained.

14 Claims, 2 Drawing Sheets

STEPPING MOTOR DRIVING CIRCUIT

BACKGROUND OF THE INVENTION

The present invention relates to a driving circuit for a stepping motor used as a paper feed driving source mounted on, for example, a line printer, and particularly to a stepping motor torque control system.

Generally, the stepping motor is driven by a driving signal consisting of excitation pulses to execute stepping rotation. When the capacity of the power supply provided for a piece of equipment having a stepping motor is relatively small, the stepping motor driving voltage frequently fluctuates depending on the operating conditions or operating environment. Moreover, the speed of the stepping motor is frequently controlled in accordance with the equipment operating conditions. When the driving voltage fluctuates upward and the motor speed decreases, the height and width of the excitation pulse increase and excessive current flows through the motor coil. Resultingly, the motor torque may decrease. Moreover, the stepping motor may become non-operational due to long periods of continuous operation resulting in overheating. In addition, the mechanical resonance point may be deviated to the relatively low speed side depending on the stepping motor. In this case, if the motor is rotated at a low speed by a high driving voltage, a large torque is generated and vibrations and noises due to resonance may be produced.

To prevent the troubling effects caused by the above-mentioned excessive power, a system is proposed to effectively decrease the driving voltage by applying intermittent chopping to the excitation pulse. The intermittent chopping controls the effective driving voltage without affecting the rotational characteristics of the stepping motor by changing the non-excitation time in the excitation time at a very high speed while the excitation pulse is outputted.

In the conventional driving system, intermittent chopping is unconditionally applied to excitation pulses regardless of variation of the driving voltage level and change in the motor speed. In this case, a problem rarely occurs when the driving voltage level is high and the motor operates at a high speed. However, if the driving voltage level lowers and the motor is decelerated, the effective driving voltage remarkably decreases and the torque of, the stepping motor decreases.

SUMMARY OF THE INVENTION

It is an object of the present invention to provide a stepping motor capable of eliminating the disadvantage of the conventional unconditional intermittent chopping system and constantly obtaining a substantially constant motor torque even if the driving voltage fluctuates and the motor speed changes. It is another object of the present invention to provide a stepping motor capable of controlling vibrations and noises even if the stepping motor is driven closely to the motor's mechanical resonance point.

Therefore, the stepping motor driving circuit of the present invention comprises control means for controlling the rotation of a stepping motor, driving means for supplying the stepping motor with a driving signal consisting of an excitation pulse train in accordance with rotation control, and chopping means for executing intermittent chopping of the excitation pulse. Moreover, the present invention is characterized in that the stepping motor driving circuit has voltage monitoring means for monitoring fluctuation of the driving voltage, and the above control means includes means for adjusting the intermittent-chopping execution time by controlling the chopping means in accordance with the monitored driving voltage. The adjusting means adjusts, for example, the delay time from the rise of the excitation pulse to the start of intermittent chopping in accordance with the driving voltage. For example, the delay time is set by being inversely proportional to the square of the driving voltage.

The driving circuit of the present invention can be applied to rotation control of the stepping motor mounted on a line printer as, for example, a paper feed driving source. In this case, the above control means controls the rotation of the stepping motor synchronously with the line printing speed of the line printer.

For the constitution of the stepping motor of the present invention, the delay time is set to be inversely proportional to the square of the driving voltage. Therefore, the delay time decreases when the driving voltage level is high. Thus, the effective driving voltage can effectively be decreased because intermittent chopping is started in a relatively short time after the excitation pulse rises. When the driving voltage level is low, however, the delay time increases. Therefore, negative effects due to the decrease of the effective voltage can be prevented because intermittent chopping is executed when a relatively long time elapses after the excitation pulse rises. In addition, when high-speed stepping rotation is executed at an interval shorter than the delay time, normal driving is executed without execution of intermittent chopping, and stable motor torque can be obtained.

DETAILED DESCRIPTION OF THE INVENTION

Figure 1:
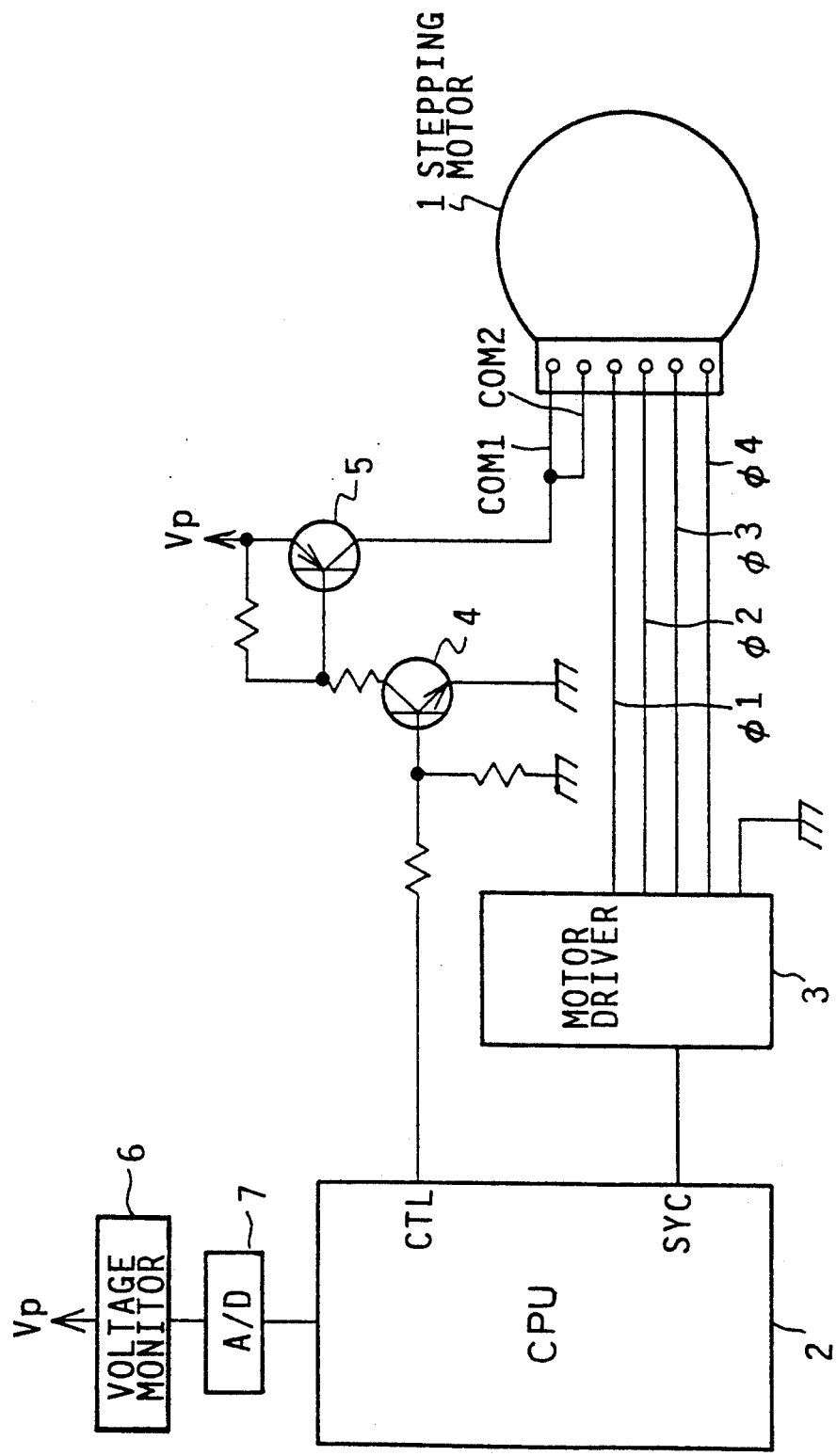
FIG. 1 is a circuit block diagram showing an embodiment of the stepping motor driving circuit of the present invention.

FIG. 1 is a block diagram showing the constitution of the stepping motor driving circuit according to one embodiment of the present invention. As shown in FIG. 1, the stepping motor driving circuit has control means such as a CPU 2 for controlling rotation of the stepping motor 1. The CPU 2 connects with driving means, such a motor driver 3 which applies a driving signal consisting of an excitation pulse train to the stepping motor 1 according to rotation control. In this embodiment, because the stepping motor 1 is driven by the 2-2-phase driving system, the motor driver 3 outputs four-phase driving signals $\phi1$ through $\phi4$. However, the present invention is not restricted to the 2-2-phase driving system. The motor driver 3 determines the phase of each driving signal according to the synchronizing signal SYC sent from the CPU 2. A pair of common electrodes COM1 and COM2 of the stepping motor 1 connect with chopping means for executing intermittent chopping of excitation pulse. In this embodiment, the chopping means consists of transistors 4 and 5 which are connected in two stages. The supply voltage Vp is applied to the common electrodes COM1 and COM2 through the second-stage transistor 5.

The power supply connects with a voltage monitor 6 for monitoring fluctuation of the driving voltage Vp. The output of the voltage monitor 6 is connected to the CPU 2 through an A-D converter 7. The CPU 2 stores adjusting means for adjusting the execution time of intermittent chopping by controlling the chopping means according to the monitored driving voltage. In this embodiment, the adjusting means applies the control signal CTL to the base electrode of the transistor 4 which is a counterpart constituting the chopping means so as to intermittently operate the chopping means. As the result of the intermittent operation, intermittent chopping is given to the driving voltage to be applied to the common electrodes COM1 and COM2. In this embodiment, the adjusting means adjusts the delay time from the rise of the excitation pulse to the start of intermittent chopping according to the fluctuation of the level of the driving voltage Vp. For example, the delay time is set by being inversely proportional to the square of the driving voltage In this embodiment, the stepping motor 1 is mounted on a line printer (not illustrated) and used as a paper feed driving source. In this case, the CPU 2 controls the line printing speed of the line printer and supplies the synchronizing signal SYC to the motor driver 3 to control rotation of the stepping motor 1. However, the present invention is not restricted to the paper-feed stepping motor of a line printer but can be applied to any type of stepping motor to be driven under conditions in which the driving voltage fluctuates and the rotational speed changes.

Figure 2:
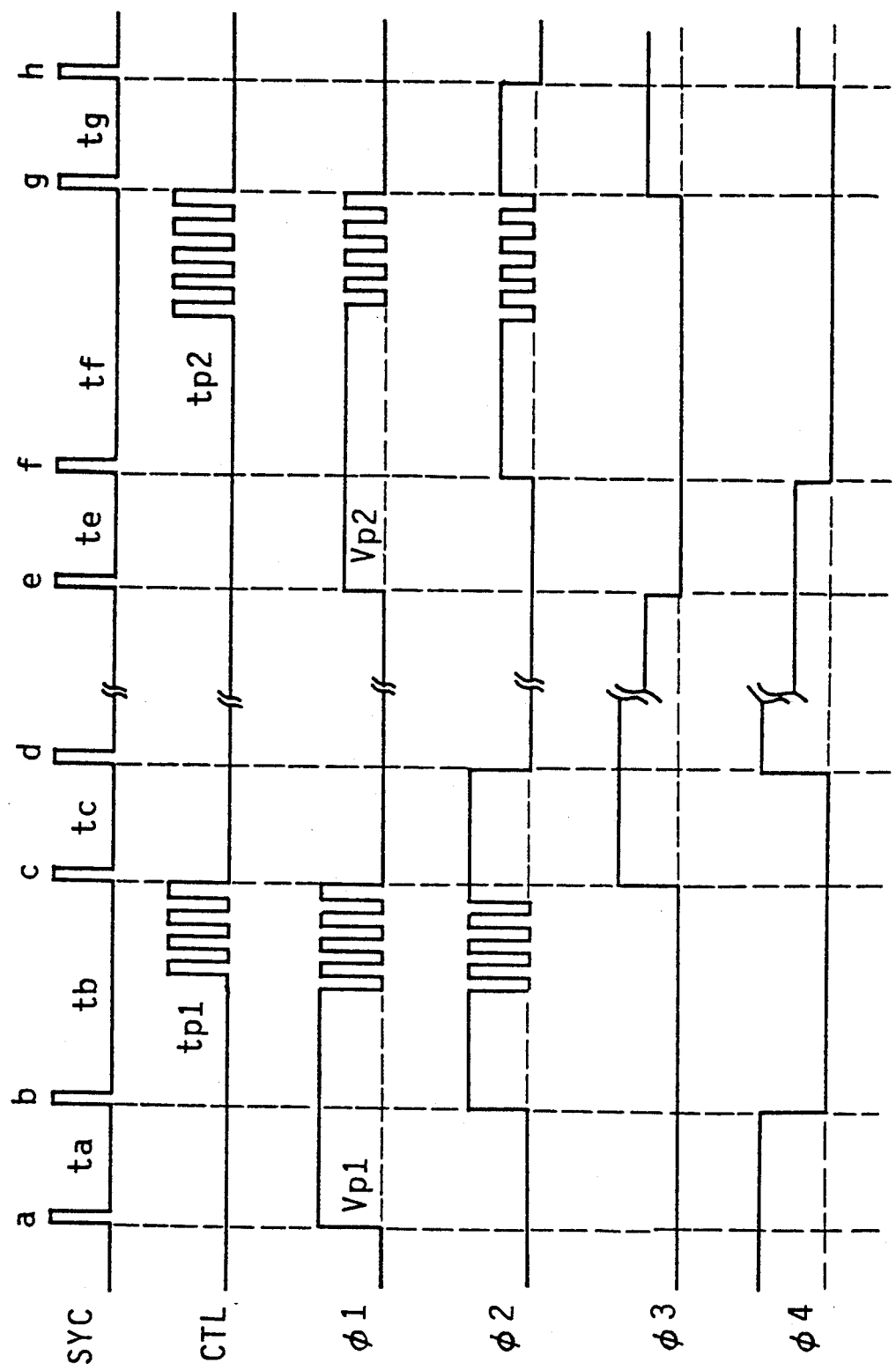
FIG. 2 is a timing chart for explaining the operation of the stepping motor driving circuit shown in FIG. 1.

Finally, the operation of the stepping motor driving circuit shown in FIG. 1 is described by referring to the timing chart in FIG. 2. The CPU 2 supplies the synchronizing signal SYC to the motor driver 3 in order to feed paper in accordance with the line-sequential printing operation of the line printer. The synchronizing signal SYC includes trigger pulses to be outputted at the times "a" through "h". The stepping motor 1 executes stepping rotation at these times "a" through "h". For example, the stepping motor 1 executes one-step rotation at time "a" and then executes one-step rotation again at time "b". The rotational position of the stepping motor is held constant for the holding time "ta" between the timings "a" and "b". One-line printing is executed during the holding time. For a line thermal printer, for example, it is necessary to control the turned-on time of the line thermal head in accordance with the dot printing rate, fluctuation of the line thermal head driving voltage, and ambient temperature. Therefore, the sequential holding times "ta" through "tg" of the stepping motor 1 vary as shown in FIG. 2.

The CPU 2 further supplies a control signal CTL to the base electrode of the transistor 4 constituting the chopping means. The control signal includes a high-speed intermittent pulse train which appears after a predetermined delay time elapses for each holding time. The delay time is inversely proportional to the square of the driving voltage Vp. For example, when a relatively high driving voltage Vp1 changes to a relatively low driving voltage Vp2, the former delay time "tp1" is set relatively short and the latter delay time "tp2" is set relatively long.

The motor driver 3 applies four driving signals $\phi 1$ through $\phi 4$ which are phase-controlled synchronously with the synchronizing signal SYC to the stepping motor 1. The first driving signal $\phi 1$ rises at time "a" to rotate the stepping motor 1 by one step. Then, the second driving signal $\phi 2$ rises at time "b" to further rotate the stepping motor 1 by one step. Then, the third driving signal $\phi 3$ rises at time "c" to execute one-step rotation. Moreover, the fourth driving signal $\phi 4$ rises at time "d" to continue one-step rotation. Thus, each driving signal rises for each time to continue step rotation. The rotational position of the stepping motor is held between the timings adjacent to each other. The first holding time "ta" is set relatively short because, for example, the printing rate of one dot line is low. Because the holding time "ta" is shorter than the delay time "tp1", intermittent chopping is not executed. The next holding time "tb" is set relatively long because, for example, the printing rate of one dot line is high. Therefore, intermittent chopping is executed up to the next timing "c" after the delay time "tp1" elapses from time "b". Concretely, intermittent chopping is applied to the excitation pulse of the driving signals $\phi 1$ and $\phi 2$ contributing to holding of the rotational position of the stepping motor 1. As a result, effective driving voltage can be controlled. Even if low-speed rotation continues at the relatively-high driving voltage Vp1, it is possible to effectively prevent the stepping motor 1 from over heating because intermittent chopping is effectively executed.

Then, if the driving voltage decreases from Vp1 to Vp2 before time "e" after time "d", the delay time "tp2" becomes longer than the former delay time "tp1". Therefore, the intermittent chopping starting time is delayed for example, in the holding time "tf" rather than the case of the former delay time "tb". That is, when the driving voltage is relatively low at a low-speed rotation, the output of the motor torque is prevented from decreasing by delaying the intermittent chopping starting time.

For this embodiment, the relationship of "tp=85/Vp2" is present between the delay time "tp" and the motor driving voltage Vp. However, the delay time "tp" is expressed in units of "ms" and the motor driving voltage Vp is expressed in the unit of V. Though the coefficient is set to 85 for this embodiment, it is not restricted to the value 85. It is possible to set the coefficient to a proper value suitable for the actual structure of the stepping motor being used. The driving voltage of a stepping motor is generally set to approx. 5 V. In this case, the delay time "tp" is obtained as 3.4 ms from the above expression. That is, when the holding time of the stepping motor exceeds 3.4 ms, intermittent chopping is executed. The delay time "tp" of 3.4 ms decreases as the driving voltage fluctuates upward and increases as it fluctuates downward. In general, when the printing-rate is low, intermittent chopping is not executed because driving of one dot line is completed in 3 ms or less. However, when the printing rate increases, intermittent chopping is executed. Because intermittent chopping affects the rotational characteristics of the stepping motor, it is necessary to change the excitation time and non-excitation time of the excitation pulse at a speed 10 times or more as high as the rotational speed. Therefore, the cycle of the chopping pulse is set to, for example, approx. 0.3 ms.

In general, the mechanical resonance point of the stepping motor 1 is deviated to the low-speed rotation side. For example, if mechanical resonance occurs at the rotational speed of approx. 120 pps, the stepping motor rotation holding time is approx. 8.3 ms. This value is much longer than the delay time of 3.4 ms set by the above expression. Therefore, when the speed of the stepping motor approaches the resonance point, intermittent chopping is always effectively executed. Thus, it is possible to control the motor torque at a low-speed rotation and effectively prevent vibrations and noises caused by resonance.

In the above embodiment, the CPU 2 generates the synchronizing signal SYC and the motor driver 3 outputs four-phase driving signals $\phi1$ through $\phi4$ synchronously with the synchronizing signal SYC so that the present invention can easily be understood. However, it is generally possible to provide the CPU 2 with a constitution in which the CPU 2 directly supplies a phase signal corresponding to a four-phase synchronizing signal to the motor driver. Also in this embodiment, the chopping means is intermittently operated by the control signal CTL. However, when the CPU2 directly outputs the phase signal, it is possible to apply chopping to the phase signal by means of software.

As described above, the present invention adjusts the intermittent chopping execution time in accordance with the fluctuation of the motor driving voltage level. When the motor driving voltage level fluctuates upward, the stepping motor can be prevented from over heating by increasing the intermittent chopping execution time. In addition, when the motor driving voltage level fluctuates downward, the motor torque can be prevented from decreasing by increasing the intermittent chopping execution time. Moreover, vibrations and noises caused by mechanical resonance at a low-speed rotation can effectively be controlled.

What is claimed is:

1. A stepping motor driving circuit comprising: control means for controlling rotation of a stepping motor, driving means for supplying the stepping motor with a driving signal composed of excitation pulses based on rotation control, chopping means for executing intermittent chopping of the excitation pulses, and voltage monitoring means for monitoring fluctuation of driving voltage.

2. A stepping motor driving circuit according to claim 1, wherein the control means has adjusting means for adjusting intermittent chopping execution time by controlling the chopping means in accordance with the monitored driving voltage.

3. A stepping motor driving circuit according to claim 2, wherein the adjusting means adjusts the delay time from a rise of an excitation pulse to the start of intermittent chopping in accordance with the driving voltage.

4. A stepping motor driving circuit according to claim 3, wherein the adjusting means sets said delay time inversely proportional to the square of the driving voltage.

5. A stepping motor driving circuit according to claim 1, wherein a stepping motor is mounted on a line printer as a paper feed driving source, and said control means controls rotation of the stepping motor synchronously with the line printing speed of the line printer.

6. A stepping motor driving circuit connectable during use to a source of driving voltage for driving a stepping motor in a stepwise manner, the driving circuit comprising: driving means for applying a driving signal composed of a train of excitation pulses to a stepping motor; chopping means responsive to a control signal for effecting intermittent chopping of the excitation pulses in accordance with the control signal; voltage monitoring means for monitoring fluctuations of the driving voltage and producing an output signal representative of the driving voltage fluctuations; and control means coacting with the driving means to produce the driving signal and responsive to the output signal from the voltage monitoring means for producing the control signal and applying same to the chopping means.

7. A stepping motor driving circuit according to claim 6; wherein the control means includes adjusting means for adjusting execution time of the intermittent chopping based on the output signal from the voltage monitoring means.

8. A stepping motor driving circuit according to claim 7; wherein the adjusting means includes means for producing the control signal applied to the chopping means.

9. A stepping motor driving circuit according to claim 7; wherein the adjusting means includes means for adjusting a delay time from the rise of an excitation pulse to the start of intermittent chopping according to the output signal from the voltage monitoring means.

10. A stepping motor driving circuit according to claim 9; wherein the delay time is inversely proportional to the square of the driving voltage level.

11. A stepping motor driving circuit according to claim 6; wherein the driving signal comprises a plurality of driving signals each of a different phase, and wherein the driving means determines the phase of each driving signal in accordance with a synchronizing signal from the control means.

12. A stepping motor driving circuit according to claim 6; wherein the control means comprises a CPU.

13. A stepping motor driving circuit according to claim 6; wherein the chopping means includes at least one chopping transistor.

14. A stepping motor driving circuit according to claim 6; wherein the chopping means comprises a plurality of chopping transistors connected in stages.

* * * * *